(12) United States Patent
Fournier et al.

(10) Patent No.: US 11,085,293 B2
(45) Date of Patent: Aug. 10, 2021

(54) SEQUENTIAL ESTIMATION WHILE DRILLING

(71) Applicant: Massachusetts Institute of Technology, Cambridge, MA (US)

(72) Inventors: Aime Fournier, Boulder, CO (US); Pawan Bharadwaj Pisupati, Melrose, MA (US); Laurent Demanet, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/594,482

(22) Filed: Oct. 7, 2019

(65) Prior Publication Data
US 2020/0386097 A1  Dec. 10, 2020

Related U.S. Application Data

(60) Provisional application No. 62/857,971, filed on Jun. 6, 2019.

(51) Int. Cl.
*E21B 49/00* (2006.01)
*E21B 44/00* (2006.01)
(Continued)

(52) U.S. Cl.
CPC ............ *E21B 49/003* (2013.01); *E21B 44/00* (2013.01); *E21B 47/06* (2013.01); *E21B 47/12* (2013.01);
(Continued)

(58) Field of Classification Search
CPC ....... E21B 47/138; E21B 49/003; E21B 47/12
See application file for complete search history.

(56) References Cited

U.S. PATENT DOCUMENTS

| 4,598,593 A | 7/1986 | Sheen et al. |
| 5,130,951 A | 7/1992 | Kingman |

(Continued)

FOREIGN PATENT DOCUMENTS

| EP | 1 249 208 A1 | 10/2002 |
| EP | 0 525 124 A1 | 3/2003 |

(Continued)

OTHER PUBLICATIONS

International Search Report and Written Opinion dated Dec. 30, 2019 in connection with International Application No. PCT/US2019/054945.

(Continued)

*Primary Examiner* — Kristyn A Hall
(74) *Attorney, Agent, or Firm* — Wolf, Greenfield & Sacks, P.C.

(57) ABSTRACT

Drilling systems and related methods are disclosed. A drilling system may include a drill bit positioned at an end of a drill string, and one or more sources and receivers positioned on the drill string behind the drill bit. The sources may be configured to emit signals into a medium surrounding a borehole in which the drill string extends, and the signals may cause a response in the medium at one or more predetermined positions ahead of the drill bit, and response signals may be measured by the one or more receivers. A processor may use the measured response signals to iteratively update an estimate of a property of the medium at the predetermined position, which in some embodiments, may be done using a sequential estimation process, as the drill string is advanced into the medium.

30 Claims, 7 Drawing Sheets

(51) Int. Cl.
*E21B 47/12* (2012.01)
*G01V 1/48* (2006.01)
*G01V 3/34* (2006.01)
*G01V 3/30* (2006.01)
*E21B 47/06* (2012.01)

(52) U.S. Cl.
CPC .................. *G01V 1/48* (2013.01); *G01V 3/30* (2013.01); *G01V 3/34* (2013.01)

(56) References Cited

U.S. PATENT DOCUMENTS

| | | |
|---|---|---|
| 5,151,882 A | 9/1992 | Kingman |
| 5,173,879 A | 12/1992 | Cung et al. |
| 5,416,750 A | 5/1995 | Doyen et al. |
| 5,994,690 A | 11/1999 | Kulkarni et al. |
| 10,616,008 B2 | 4/2020 | Pisupati et al. |
| 2002/0120401 A1 | 8/2002 | Macdonald et al. |
| 2004/0124009 A1 | 7/2004 | Hoteit et al. |
| 2007/0285274 A1 | 12/2007 | Esmersoy |
| 2007/0294036 A1 | 12/2007 | Strack et al. |
| 2008/0025521 A1 | 1/2008 | Morise et al. |
| 2008/0281523 A1 | 11/2008 | Dahl et al. |
| 2009/0006058 A1 | 1/2009 | King |
| 2012/0068712 A1 | 3/2012 | Taherian et al. |
| 2013/0116926 A1 | 5/2013 | Rodney et al. |
| 2013/0215717 A1 | 8/2013 | Hofland et al. |
| 2014/0104980 A1 | 4/2014 | Sava et al. |
| 2014/0121971 A1 | 5/2014 | Hanak et al. |
| 2016/0334270 A1 | 11/2016 | Van Manen et al. |
| 2017/0307772 A1 | 10/2017 | Jutila et al. |
| 2018/0171772 A1 | 6/2018 | Rodney |
| 2019/0078430 A1 | 3/2019 | Fonda et al. |
| 2019/0293832 A1 | 9/2019 | Grobbe et al. |
| 2019/0349223 A1 | 11/2019 | Pisupati et al. |
| 2020/0213164 A1 | 7/2020 | Pisupati et al. |

FOREIGN PATENT DOCUMENTS

| | | |
|---|---|---|
| WO | WO 90/03616 A1 | 4/1990 |
| WO | WO 2006/045340 A1 | 5/2006 |
| WO | WO 2017/160162 A1 | 9/2017 |

OTHER PUBLICATIONS

International Search Report and Written Opinion for International Application No. PCT/US2019/023456 dated Jun. 5, 2019.
International Search Report and Written Opinion for International Application No. PCT/US2019/031481 dated Jul. 29, 2019.
PCT/US2019/054945, Dec. 30, 2019, International Search Report and Written Opinion.
U.S. Appl. No. 16/361,073, filed Mar. 21, 2019, Demanet et al.
U.S. Appl. No. 16/407,884, filed May 9, 2019, Pisupati et al.
U.S. Appl. No. 16/817,089, filed Mar. 12, 2020, Pisupati et al.
PCT/US2019/023456, Jun. 5, 2019, International Search Report and Written Opinion.
PCT/US2019/031481, Jul. 29, 2019, International Search Report and Written Opinion.

SEQUENTIAL ESTIMATION WHILE DRILLING

CROSS-REFERENCE TO RELATED APPLICATIONS

This application claims the benefit under 35 USC 119(e) of U.S. Provisional Application No. 62/857,971, filed Jun. 6, 2019, the disclosure of which is incorporated herein by reference in its entirety.

FIELD

Disclosed embodiments are related to systems and methods for estimating properties of a medium, for example, during a drilling operation.

BACKGROUND

A wide variety of drilling or probing operations are performed in diverse types of media. For example, conventional drilling operations include oil and gas operations, $CO_2$ sequestration and injection operations, and various fresh water operations. Often, prior to commencing a drilling operation, a survey of the medium to be drilled is conducted to assess the properties of the medium. Such surveying operations are typically done with surface-based or otherwise remote measurements of the medium where seismic measurements are made using seismic sources and sensors positioned on the surface above the medium.

SUMMARY

In one embodiment, a drilling system comprises a drill bit configured to be positioned at an end of a drill string, one or more sources positioned on the drill string behind the drill bit and configured to emit a signal into a medium and generate a response signal from one or more positions within the medium ahead of the drill bit, one or more receivers positioned on the drill string behind the drill bit and configured to detect the response signal, and a processor operatively coupled to the one or more sources and the one or more receivers. The processor is configured to iteratively update an estimate of one or more properties of the medium at the one or more predetermined positions, based at least in part, on the response signal detected by the one or more receivers.

In another embodiment, a method comprises for determining a medium property ahead of a tool comprises obtaining an initial estimate of a medium property at a predetermined position within the medium and iteratively updating an estimate of the medium property by iteratively performing the steps of emitting a signal from a tool towards the predetermined position, measuring a response signal from the predetermined position, and determining an updated estimate of the medium property at the predetermined position. The predetermined position is located ahead of an end of the tool. During an initial iteration the updated estimate of the medium property is determined based at least in part on the initial estimate of the medium property and the measured response signal, and during subsequent iterations the updated estimate of the medium property is determined based at least in part on the updated estimate of the medium property from a prior iteration and the measured response signal.

In a further embodiment, at least one non-transitory computer-readable storage medium is provided storing processor executable instructions that, when executed by at least one hardware processor, cause the at least one hardware processor to perform a method. The method comprises obtaining an initial estimate of a medium property at a predetermined position within the medium and iteratively updating an estimate of the medium property by iteratively performing the steps of emitting a signal from a tool towards the predetermined position which may be located ahead of an end of the tool, measuring a response signal from the predetermined position, and determining an updated estimate of the medium property at the predetermined location. During an initial iteration the updated estimate of the medium property is determined based at least in part on the initial estimate of the medium property and the measured response signal, and during subsequent iterations the updated estimate of the medium property is determined based at least in part on the updated estimate of the medium property from a prior iteration and the measured response signal.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
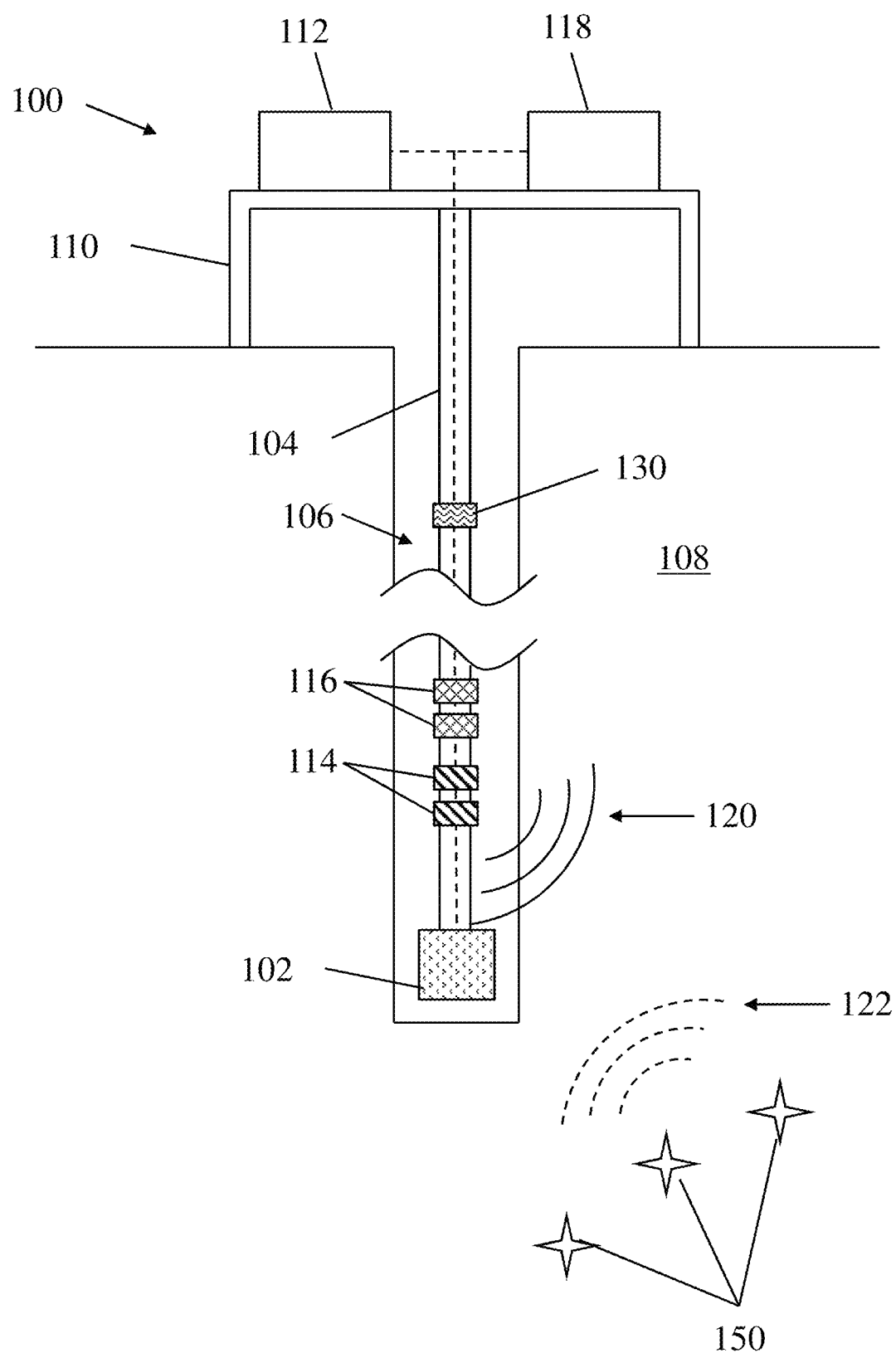
FIG. 1 is a schematic representation of a drilling system, according to some embodiments.

The inventors have appreciated that drilling into a medium having unknown and/or variable properties may carry associated uncertainties for a drilling operation, which may impact the cost and/or predictability of the operation. Properties that may be important during a drilling operation may include, but are not limited to, anomalously high or low pore-fluid pressures, high temperatures, weak formations, faults, fractures, and other properties associated with formations within the medium. However, in conventional drilling systems, many of these medium properties cannot be characterized before drilling into the medium. For example, when drilling in depleted reservoirs, one significant challenge results from the unknown pore pressure distribution in the medium, since the pore pressures can only be measured in situ when a drill bit has already penetrated the medium and one or more sensors on a drill string are in contact with the pore fluid. Moreover, in other applications, existing approaches for characterizing a medium may involve large-scale operations such as drilling multiple bore holes around a region to be characterized to facilitate placement of various seismic sources and sensors. Accordingly, such approaches may not be cost effective for many drilling operations and/or may not be suitable for providing information about the medium during the course of a drilling operation.

In view of the foregoing, the inventors have recognized and appreciated numerous benefits associated with drilling systems and related methods that can provide information related to one or more properties of a heterogeneous medium (e.g., pore pressures within formations of the medium). For example, in one embodiment, the systems and methods described herein may provide such information for a region of the medium ahead of a drill bit or tool, including during a drilling operation. According to some aspects, the systems and methods described herein may utilize a sequential Bayesian (or other) estimation approach to generate successive estimates of one or more properties of a medium ahead of a drill, for example, as the drill is advanced through the medium.

In some embodiments, a tool (e.g., a drilling tool) may include one or more sources and receivers positioned on a drill string. The sources may be configured to emit acoustic and/or elastic energy into the medium ahead of the drill bit, which may be fully or partially focused at one or more predetermined locations within the medium (e.g., operator-specified locations), as described below. The acoustic and/or elastic energy may induce a response within the medium that can be measured by the one or more receivers. In this manner, the presently disclosed embodiments may provide localized information about properties of the medium ahead of the drill, which may be used to update a prior estimate of the properties of the medium. As a drilling operation proceeds, this process may be repeated to iteratively obtain further refined estimates of the medium properties, thus reducing the uncertainty of the medium properties ahead of the drill. For example, a borehole operation (e.g., a drilling operation) may begin with an initial estimate of the medium properties (i.e., a prior estimate of the medium properties), which may be based on historical drilling and/or production data, and/or based on prior models of the medium. This initial estimate may have relatively large uncertainties regarding one or more properties of the medium at one or more locations, such as locations ahead of a drill bit (e.g., tens of meters ahead of the drill bit). As the operation proceeds, data acquired by the receivers may be used to update the estimate of the medium properties and provide a posterior estimate of the medium properties having lower uncertainty. In subsequent iterations (e.g., as the drill string is advanced into the medium), the posterior estimate may replace the prior estimate to further refine the estimate of the material properties based on additional measured data. In this manner, successively more certain estimates of medium properties ahead of a drill bit, or other tool located within a borehole, may be acquired in real time during the borehole operation. Depending on the particular application, such refined estimates of the medium properties may provide improved risk assessment, avoidance, and mitigation, and/or more accurate in situ sensing of medium properties ahead of the drill bit compared to conventional approaches, which are limited to acquiring data at the surface and/or from behind the drill bit.

As described in more detail below, in some embodiments, the systems and methods described herein may utilize data from behind a drill bit during a drilling operation in conjunction with data measured from ahead of the drill bit (as described above) during a sequential estimation process. For example, such data from behind the drill bit may be gathered by logging while drilling (LWD) and/or measuring while drilling (MWD) systems as are known in the art. Alternatively or additionally, some embodiments of the techniques described herein may utilize preexisting models of a medium and/or historical data from prior drilling operations in the medium in conjunction with real-time data from ahead of and behind the drill bit during a drilling operation. However, it should be understood that the current disclosure is not limited to systems or methods employing any particular combination of data sources from behind the drill bit and/or prior models or data regarding the medium.

While some of the embodiments described herein may include a drill bit (or similar tool arrangement configured to form a borehole or similar structure in a medium), it should be understood that the disclosed systems may also be embodied as sensing tools that do not include a drill bit. For example, such embodiments of sensing tools may be used in connection with a drilling operation (e.g., to provide information related to the medium being drilled), and/or may be used in non-drilling applications, such as for geological surveying applications (including data acquisition from the surface of the Earth). For example, in one embodiment, a sensing tool may include a plurality of sources and receivers configured as a sensing tool that may be advanced down an existing borehole.

Some aspects described herein may utilize seismo-electromagnetic conversion within a medium to assess one or more properties of a medium. As used herein, seismo-electromagnetic conversion may generally refer to the coupling between mechanical waves (e.g., acoustic waves, elastic waves, poroelastic waves, seismic waves, pressure waves, and/or shear waves) propagating within the medium and electromagnetic wavefields, and conversion of such mechanical waves into electromagnetic fields. As explained in more detail below, this conversion may result from charge separation that occurs when the seismic waves encounter interfaces within the medium, such as between porous layers having different properties (e.g., different pore pressures or viscosities). The inventors have appreciated that focusing seismic waves at one or more positions either ahead of a drill bit in a drilling system, or at some other appropriate position, may cause localized seismo-electromagnetic conversion at the one or more positions which may generate electromagnetic signals that can be measured via sensors positioned on a drill string. It should be understood that in some embodiments, a predetermined position that a signal is focused on may correspond to a small spatial region around the position. In either case, due to the acoustic and/or elastic energy (and in some instances poroelastic energy) of the seismic waves being focused on the one or more predetermined positions, the magnitude of the seismic waves at the one or more predetermined positions may be greater than in other portions of the medium. Accordingly, the resulting electromagnetic signal may be dominated by the seismo-electromagnetic effect at those one or more predetermined positions. Further, if the applied waveforms are controlled to focus the seismic waves on the one or more points in a sequential manner, the resulting electromagnetic signal may also include separate corresponding discrete signals that may be paired with the corresponding predetermined positions to determine properties of the surrounding medium at each of those positions individually. In either case, such electromagnetic signals can be used to characterize one or more properties of the medium at the one or more positions and/or to generate a drilling risk metric as noted above.

As used herein acoustic and/or elastic energy and/or waves propagating within a medium may refer to any of a number of types of seismic waves that may propagate through a medium such as a portion of earth. Such waves may include pressure waves (P-waves, including fast and slow P-waves), which are longitudinal compression waves and shear waves (S-waves), which are transverse waves. In some instances, acoustic energy and/or acoustic waves may refer to only longitudinal pressure waves (i.e., compression waves), while elastic energy and/or elastic waves may refer to a combination of pressure waves and shear waves (including, for example, in a poroelastic formulation comprising descriptions of fluid and solid constituent waves, fields, and properties).

Moreover, as used herein focusing seismic waves, waveforms, and/or energies, which may include acoustic, elastic, poroelastic, pressure, shear, and/or other appropriate types of wave, waveform and/or energy, at a particular position may refer to the combination of wave interference and/or reflections of waves that may occur within a medium to create a desired waveform with a specified magnitude and combination of acoustic and/or elastic waveforms at a specific location. For example, a magnitude of the waveform may be greater at the specified location at a particular point in time as compared to surrounding portions of the medium. Thus, the waveforms, and corresponding energies, emitted by seismic sources of a tool may be considered to be focused on this location at a predetermined point in time. Moreover, as used herein, acoustic and/or elastic energy or waves refers to any suitable combination of acoustic, elastic, poroelastic, pressure, and/or shear energy or waves.

In one embodiment, a drilling system may include a drill configured to be positioned at an end of a drill string and configured to form a borehole in a medium. The system may further include one or more sources positioned along the drill string behind the drill bit and configured to emit acoustic and/or elastic energy (i.e., seismic waves) into the medium. The sources may be operatively coupled to a controller configured to control operation of the one or more sources such that the acoustic and/or elastic energy is focused at one or more predetermined positions within the medium ahead of the drill bit. For example, the sources may include pressure sources such as downhole seismic sources, as are known in the art. The drilling system also may include one or more receivers positioned along the drill string behind the drill bit and configured to detect an electromagnetic signal generated by localized seismo-electromagnetic conversion at the one or more predetermined positions resulting from the focused acoustic and/or elastic energy. The receivers may be operatively coupled to the controller, and the controller may receive data from the one or more receivers and use the data to perform a Bayesian (or other) update of an estimate of the properties of the medium at the predetermined location(s). For example, the receivers may include electrodes, coils, and/or any other appropriate detector configured to detect an electrical potential (e.g., based on an electric field generated by seismoelectric conversion), which may correspond to a pore pressure in a region of the medium ahead of the drill bit. As the drill string advances in the medium, the above-described process may be repeated to further refine the estimate of the medium properties. In this manner, the drilling system may perform a sequential estimation of the properties of the medium at the one or more predetermined locations. In some applications, the operation of the controller may be configured to correct and improve itself based on active feedback. For example, such active feedback may be used to automatically refine control of the focusing position and time after updating an estimate of a velocity model that relates space and time within the medium (i.e., a formation velocity model).

In the above embodiment, the system is used for determining a pore pressure in a region of the medium at a predetermined position ahead, or at some other appropriate location, relative to the system. However, it should be understood that the disclosed methods and systems herein may be used for determining any appropriate property of a medium. For example, a medium property determined using the methods and systems described herein may include, a conductivity, a formation layer or feature thickness (e.g. a fault, a calcareous "stringer", or other type of layer or feature), a pore pressure, and/or any other appropriate medium property as the disclosure is not limited in this fashion.

In view of the above, appropriate types of sources may correspond to any appropriate device capable of generating a desired signal within a medium. For example, depending on the embodiment, signal sources may include, but are not limited to, mechanical sources, seismic acoustic sources, speakers, radar or other electromagnetic sources, and/or any other appropriate device capable of generating acoustic signals, elastic signals, electromagnetic signals, and/or any other desired signal. Correspondingly, sensors that may detect the signals emitted by these sources may include, but are not limited to, geophones, hydrophones, pressure sensors, microphones, photosensitive detectors, electromagnetic detectors, and/or any other appropriate type of sensor capable of detecting the desired signals transmitted from a corresponding signal source. Accordingly, it should be understood that the disclosed methods are generally applicable to a number of different systems implementing a variety of different sources and sensors.

It should be understood that the current disclosure is not limited to any particular technique for achieving focusing of seismic energy, and correspondingly, localized seismoelectric conversion, in a predetermined region of a medium. For example, in some embodiments, a controller of a drilling system may be configured to control operation of two or more sources positioned on a drill string such that acoustic and/or elastic energy emitted by the sources is focused at the predetermined region of the medium. In particular, the controller may be configured to determine waveforms for the acoustic and/or elastic energy to be emitted from the sources to achieve such focusing. In one exemplary embodiment, the controller may determine the waveforms using time-reversal focusing based on a model of acoustic and/or elastic wave propagation within the medium, such as a model of wave velocities within the medium. The controller may use the model to determine propagation of desired acoustic and/or elastic waveforms from the predetermined region through the medium towards positions of the sources to obtain modeled signals at the position of the sources, and subsequently time reverse the modeled signals to obtain the focusing waveforms. In another exemplary embodiment, a controller may utilize a data-driven approach to determine suitable focusing waveforms. For example, the controller may control the sources to emit acoustic and/or elastic energy into the medium, and reflected acoustic and/or elastic energy from the medium may be measured by one or more sensors positioned on the drill string, and the controller may determine focusing waveforms based on the measured reflected acoustic and/or elastic signals. For instance, the controller may determine the focusing waveforms via an iterative process or inversion process such as a Marchenko focusing scheme in which the reflected signals are used to iteratively update the focusing waveforms (e.g., focusing functions) until the focusing waveforms converge to provide the desired focusing of the waveforms at the predetermined region within the medium.

Moreover, while some embodiments described herein utilize seismo-electromagnetic conversion induced by focused acoustic and/or elastic energy emitted into the medium, it should be understood that the current disclosure is not limited in this regard. For example, some embodiments may include one or more electromagnetic sources configured to emit electromagnetic energy into the medium to induce an electromagnetic or electroseismic-conversion response at one or more predetermined positions within the medium, Depending on the particular embodiment, electromagnetic data from the one or more receivers may be used to sequentially infer posterior estimates of medium properties using any suitable technique. For example, as noted above, a drilling operation may begin with an initial (prior) estimate of the properties of the medium, and the estimate may be updated to infer posterior estimates via sequential Bayesian estimation (or other type of sequential estimation) based on the data acquired by the receivers. Suitable approaches to update estimated medium properties (i.e., to infer posterior estimates from the receiver data) include, but are not limited to, approaches employing quadratic optimization, the Kalman filter, a particle filter, sequential Monte Carlo filters, and/or other solutions of the general stochastic-process filtering problem. Accordingly, it should be understood that the current disclosure is not limited to any particular techniques for performing a Bayesian update or any other suitable type of statistical inference such as Akaikean, frequentist, likelihoodist, and/or minimum description length approaches.

In some embodiments, one or more aspects of a drilling operation may be controlled and/or varied in response to estimations of medium properties based on the sequential Bayesian estimation techniques described herein. For example, the drilling operation may be controlled to change various drilling parameters, such as a drilling pathway or course through the medium, a drill speed, applied torque, and/or a "mud" (drilling-fluid) weight. Alternatively, information related to the estimated medium properties may be used to halt or slow a drilling operation and/or output a warning to an operator through an appropriate output device (e.g. a display, light, speaker, or other appropriate device) if the estimated properties exceed a threshold difference from expected medium properties. However, it should be understood that the current disclosure is not limited to any particular adjustments to a drilling operation, and that a drilling process need not be adjusted in some embodiments (e.g., in surveying applications).

While some aspects of the present disclosure are described in connection with drilling applications and/or measurements in geological media (e.g., in the Earth), the inventors have appreciated that the systems and methods described herein may be suitable in other applications, including imaging, probing, and/or remote measurement applications. For example, the sequential estimation techniques described herein may be used in connection with medical imaging applications to determine one or more properties of tissue ahead of an imaging probe (e.g., an ultrasonic probe).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of a drilling system 100. The system includes a drill bit 102 positioned at the end of a drill string 104. As illustrated, the drill string 104 is supported by a support structure 110 (e.g., a derrick or other suitable structure) and the drill string 104 may extend into a borehole 106 formed by the drill bit 102 in a medium 108. Depending on the particular type of drilling operation, the drilling system may include conventional drilling equipment 112 such as one or more conventional pumps, motors, storage tanks, and so on, as are known in the art. Though, embodiments in which the string does not include a drill bit and the string is lowered into a pre-existing bore are also contemplated.

The system 100 includes sources 114 positioned on the drill string and configured to emit signals 120 into the medium 108. For example, the sources 114 may be pressure sources configured to emit acoustic and/or elastic energy signals into the medium 108 ahead of the drill bit 102 so as to induce localized seismoelectric conversion at one or more predetermined positions 150 ahead of the drill bit 102. In some applications, the drill bit 102 may be considered as the only source, and/or as a supplement to other sources 114 that may operate simultaneously (e.g., while drilling). In other embodiments, the sources may include electromagnetic sources such that the signals 120 comprise electromagnetic energy directed towards the positions 150. The signals 120 emitted by the sources 114 induce a response at positions 150, which results in response signals 122 that may be measured by receivers 116 positioned along the drill string 104. As noted above, the receivers 116 may include acoustic detectors, directional accelerometers, distributed acoustic sensors, geophones or other mechanical displacement detectors, as well as electrodes, coils, or other appropriate detectors configured to detect an electrical potential signal 122 (e.g., resulting from seismoelectric conversion).

The sources 114 and sensors 116 are operatively coupled to a controller 118 that may be configured to control operation of these various components, and in some instances (e.g., via a suitable artificial intelligence system or predetermined control scheme) operation of the drill bit 102 and drilling equipment 112. For example, the controller may be configured to control the sources 114 to emit focused signals 120 towards the positons 150 ahead of the drill bit 102. In some instances, such focused signals may comprise focused acoustic and/or elastic energy configured to cause localized seismoelectric conversion at the positions 150. The controller 118 may receive data from the receivers corresponding to the response signals 122 measured by the receivers 116, and the controller may use the data to update an estimate of the properties of the medium 108 at the predetermined locations 150. For example, the controller may be provided with an initial estimate of the medium properties, and the controller may perform sequential updates of the estimate based on data from the receivers 116 as the drill string 104 is advanced into the medium (e.g., towards the positions 150). As discussed above, such updates of the estimated medium properties during a drilling operation may provide for more precise estimation of the medium properties with reduced uncertainty. In the depicted embodiment, the controller 118 may be positioned outside of the borehole 106, and may communicate with the drill bit 102, sources 114, and/or receivers 116 in any suitable manner, such as via a wired connection though the drill string 104 and/or via a wireless communication protocol. In other embodiments, one or more controller components may be positioned within the drill string 104. Additionally, the controller may include at least one processor connected with at least one non-transitory computer readable storage medium including processor executable instructions that when executed control the various components of the drilling system to perform the methods as described herein.

In addition to the above, the drilling system 100 includes a system 130 located on the drill string 104 configured to perform measurements and/or log information from behind the drill bit 102 during a drilling operation. For example, the system 130 may include conventional logging while drilling (LWD) systems and/or measuring while drilling (MWD) systems, as are known in the art. The system 130 may be operatively coupled to the controller 118, and as described in more detail below, the controller may use data from behind the drill bit 102 acquired by system 130 in conjunction with data from ahead of the drill bit (from sources 114 and sensors 116 as discussed above) during a sequential estimation process as described herein.

Figure 2:
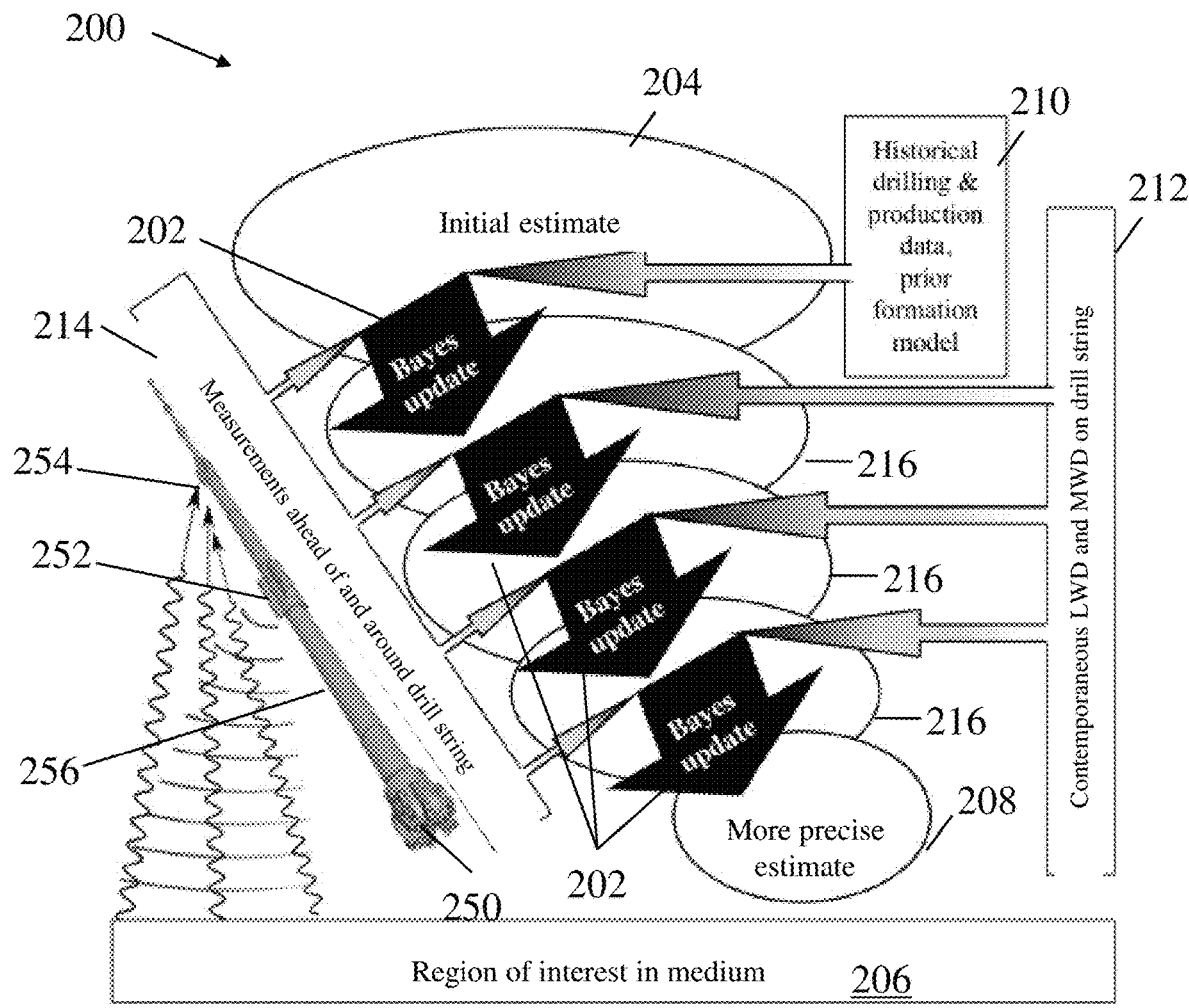
FIG. 2 is a schematic flow diagram depicting a sequential Bayesian estimation process, according to some embodiments.

FIG. 2 depicts a schematic diagram 200 showing a sequential Bayesian estimation process during a drilling operation. In particular, the process includes a series of Bayes updates 202 of an initial estimate 204 of the properties of a medium in a region of interest 206 to obtain a more precise estimate 208. On the right side of the diagram, prior information about the medium 210, such as historical drilling and production data and/or existing models of the medium, as well as contemporaneous data 212 from behind the drill bit 250 from logging while drilling (LWD) and/or measurements while drilling (MWD) systems are fed into the Bayes updates 202. Additionally, as shown on the left side of the diagram, active measurements 214 from ahead of and around the advancing drill bit 250 (e.g., from one or more sources 252 and/or from the drill bit 250, and corresponding receivers 254 on the drill string 256 as described above) are also fed into each of the Bayes updates 202. As the process proceeds through the sequential Bayes updates and the drill advances into the medium, the uncertainty in the estimated medium properties, indicated by the area of the ellipses 216 corresponding to sequential estimates between each Bayes update, decreases to achieve the more precise final estimate 208. While a sequence of four Bayes updates is shown in FIG. 2, it should be appreciated that the systems and methods described herein may utilize any suitable number of Bayes updates to achieve a desired degree of precision for the estimate of the medium properties.

Depending on the particular embodiment, a sequential Bayesian estimation process, such as the process depicted in FIG. 2, may be performed using any suitable type of controller of a drilling system (e.g., controller 118 shown in FIG. 1). For example, a controller may include at least one hardware processor and at least one non-transitory computer-readable storage medium storing processor executable instructions that, when executed by at least one hardware processor, cause the at least one hardware processor to perform a sequential estimation process, as described herein, to estimate the properties of a medium in a region ahead of a drill bit. In some embodiments, the controller may control operation of a drill bit during a drilling operation based on the medium properties estimated by the focused blind deconvolution process, such as automated risk assessment or other decision analysis.

Figure 3:
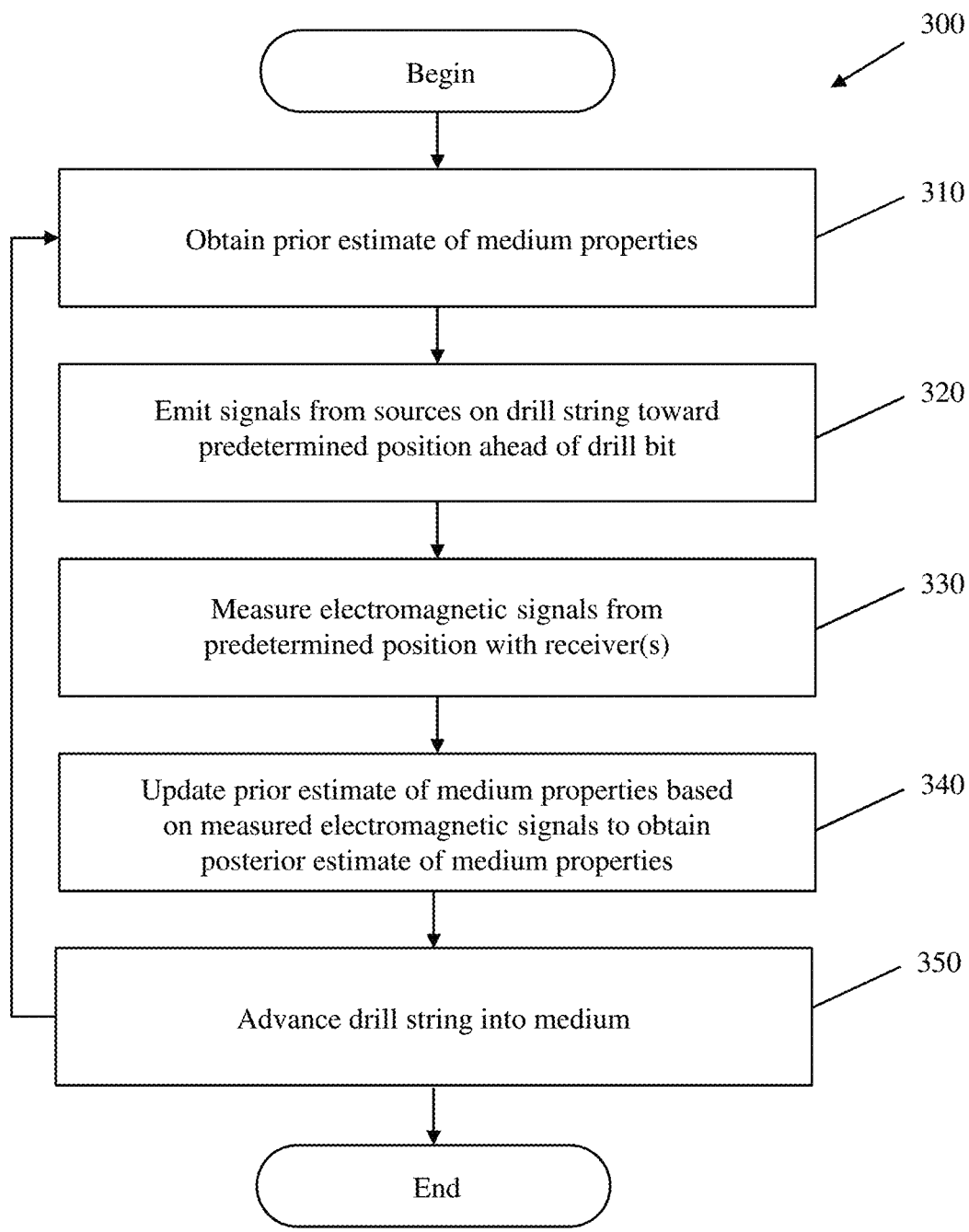
FIG. 3 is a flow chart depicting a method of estimating properties of a medium during a drilling operation, according to some embodiments.

Referring now to FIG. 3, one embodiment of a process 300 for performing a sequential estimation of the properties of a medium is described in more detail. Process 300 may be performed on any suitable computing device(s) (e.g., a single computing device, multiple computing devices co-located in a single physical location or located in multiple physical locations remote from one another, one or more computing devices part of a cloud computing system, etc.), as aspects of the technology described herein are not limited in this respect. In some embodiments, a computing device may be a controller of a system implementing the disclosed methods. Further, similar to a controller, a computing device may include at least one hardware processor and at least one non-transitory computer-readable storage medium storing processor executable instructions that, when executed by at least one hardware processor, cause the at least one hardware processor to perform a sequential estimation process, as described herein, to estimate the properties of a medium.

The process begins at step 310 where a prior estimate of one or more properties of a medium is obtained. For example, as noted above, the initial prior estimate may be based on historical drilling and/or production data, or may be based on a prior model of the properties of the medium. The process then proceeds to step 320, where one or more signals are emitted from sources located on a drill string of a drilling system. As discussed previously, the signals may include acoustic and/or elastic energy, and/or electromagnetic signals, which may be focused towards one or more predetermined positions within the medium (e.g., regions of interest for a drilling operation). The predetermined positions are located within the medium ahead of the drill bit.

The process then proceeds to step 330, where electromagnetic, mechanical, or other physical signals from the predetermined position(s) are measured with one or more receivers positioned on the drill string. For example, the electromagnetic signals may correspond to signals generated from seismoelectric conversion caused by the focusing of acoustic and/or elastic energy emitted by the sources in step 320.

The process then proceeds to step 340, at which point the prior estimate of the medium properties is updated, at least in part, based on the measured electromagnetic or other signals from the receivers as the drill string is advanced into the medium, to form a posterior estimate of the medium properties. As noted above in connection with FIG. 2, in some instances, a prior estimate also may be updated based, in part, on contemporaneous data from logging while drilling (LWD) or measuring while drilling (MWD) systems, which may collect data from the borehole behind the drill bit. The drill string may advance further into the medium at step 350, at which point the process may return to step 310 with the updated estimate (i.e., posterior estimate) from step 340 being used as the new prior estimate. In some embodiments, the prior estimate may be updated by updating a data set corresponding to the prior estimate with the updated estimate of the medium properties. This data set may then be used for recalling the currently updated estimate as a prior estimate of the medium properties during a subsequent iteration of the method. Depending on the particular embodiment, the data set may be stored in an appropriate non-transitory computer readable medium as described further herein. With each iteration of the process 300, an uncertainty in the estimated medium properties decreases to provide a more precise estimate of the medium properties.

Figure 4:
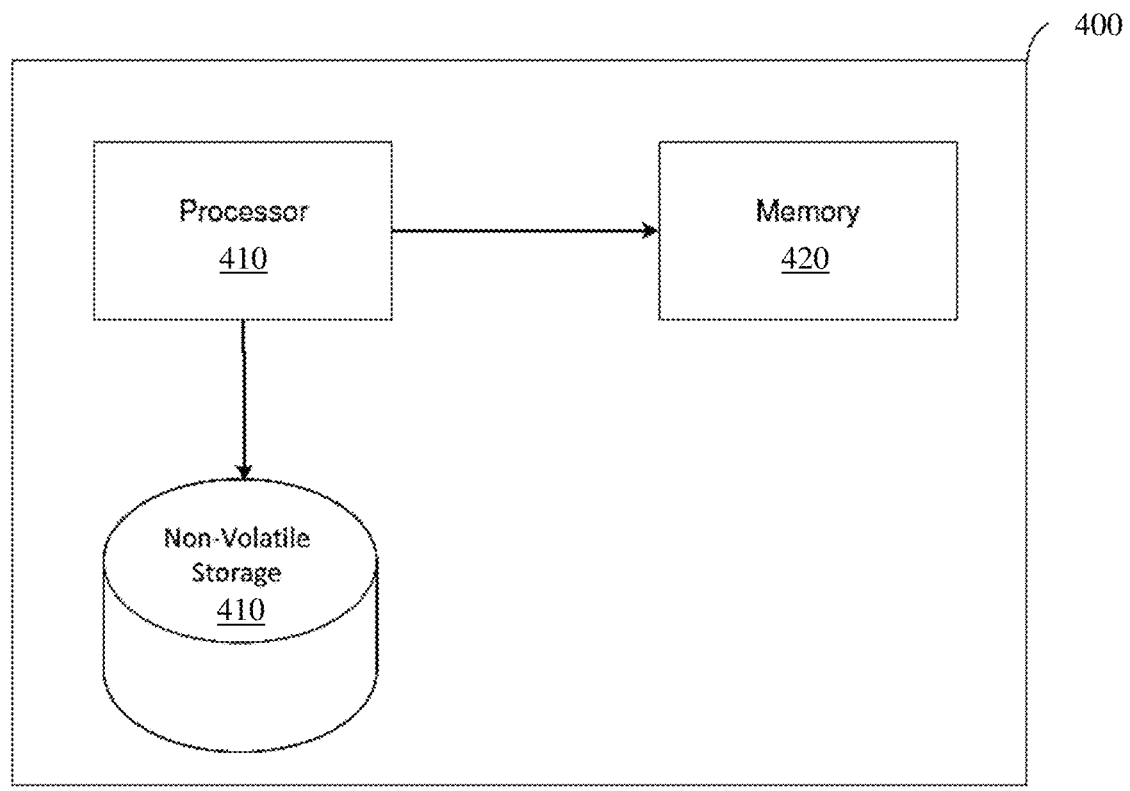
FIG. 4 is a block diagram of an illustrative computer system that may be used in implementing some embodiments.

An illustrative implementation of a computer system 400 that may be used in connection with any of the embodiments of the technology described herein is shown in FIG. 4. The computer system 400 includes one or more processors 410 and one or more articles of manufacture that comprise non-transitory computer-readable storage media (e.g., memory 420 and one or more non-volatile storage media 430). The processor 410 may control writing data to and reading data from the memory 420 and the non-volatile storage device 430 in any suitable manner, as the aspects of the technology described herein are not limited in this respect. To perform any of the functionality described herein, the processor 410 may execute one or more processor-executable instructions stored in one or more non-transitory computer-readable storage media (e.g., the memory 420), which may serve as non-transitory computer-readable storage media storing processor-executable instructions for execution by the processor 410.

Example—Sequential Bayesian Estimation with Seismoelectric Conversion

In one example, a mathematical framework for performing a sequential Bayesian estimation process in connection with measurements of seismoelectric conversion is provided. The seismoelectric conversion may be a result of an acoustic wave propagating through a medium.

An acoustic wave in the bulk of a medium with isotropic stress P and displacement rate V is governed by a differential equation $$\left(\frac{\partial}{\partial t} + \begin{pmatrix} 0 & \rho c^2 \nabla \cdot \\ \rho^{-1} \nabla & 0 \end{pmatrix}\right)\begin{pmatrix} P \\ V \end{pmatrix} = \begin{pmatrix} 0 \\ F_s \end{pmatrix} \quad (1)$$

where c(x) and ρ(x) are the acoustic-wave speed and mass-density functions of the medium and $F_s$ represents external sources. Empirically, the fluid pressure and flow velocity p=BP and v=−λ∇p are obtained from the bulk ones using Skempton's coefficient B and Darcy's Law, where λ is the ratio of mobility to porosity. An electrical diffuse layer present between the fluid skeleton of the medium implies a current (q/λ)v, the proportionality factor q/λ, defined for convenience below. This induces a balancing electrostatic current −σ∇ψ, conductivity multiplied by electrical potential gradient. Putting these together, the divergence of Ampere's Law provides:

$$\nabla \cdot (\sigma \nabla \psi + q \nabla (BP)) = 0 \quad (2)$$

Equation 2 is an elliptic partial differential equation to be solved for ψ(t, x) given the parameter functions B(x), q(x), and σ(x), field P(t, x) from equation (1), and boundary conditions on insulating or conducting boundaries. The formal structure of equation (2) may be expressed as:

$$\mathcal{L}[\sigma] = -\mathcal{L}[q] p \quad (3)$$

where $\mathcal{L}[r] = \nabla \cdot r \nabla$ is an elliptic partial differential operator if r(x)>0 for all x in the domain.

Sensitivity Analysis

The sensitivity of ψ(t, x″) to σ(x) may be determined by Fréchet differentiation of $(\mathcal{L}[\sigma]u)(x')$ for arbitrary u(x″), $$((\mathcal{L}[\sigma + \varepsilon] - \mathcal{L}[\sigma])u)(x') = \langle \delta(\cdot - x'), \nabla \cdot \varepsilon \nabla u \rangle$$
$$= -\langle \nabla \delta(\cdot - x') \cdot \nabla u, \varepsilon \rangle \Leftrightarrow \frac{\partial \mathcal{L}}{\partial \sigma(x)}$$
$$= -\nabla \delta(x - \cdot) \cdot \nabla$$

that is an operator with a very sparse numerical discretization, requiring no storage. Holding p and q as fixed functions, the variation of equation (3) would determine a 2-point sensitivity field ∂ψ(t, x″)/∂σ(x) as the solution of $$\mathcal{L}[\sigma]\frac{\partial \psi}{\partial \sigma} = -\frac{\partial \mathcal{L}}{\partial \sigma}\psi \quad (4)$$

except implying large storage that should be avoided. In this example, it is sufficient to study the squared error norm between simulation and measurement $$\Phi = \tfrac{1}{2}\|\psi - \psi_{meas}\|^2 \quad (5)$$

with Fréchet derivative $$\frac{\partial \Phi}{\partial \sigma} = \left\langle \psi - \psi_{meas}, \frac{\partial \psi}{\partial \sigma} \right\rangle = -\left\langle \chi, \frac{\partial \mathcal{L}}{\partial \sigma}\psi \right\rangle \quad (6)$$

if the adjoint field χ is determined as follows. Applying equation (4) to equation (6) yields $$\left\langle \chi, \mathcal{L}[\sigma]\frac{\partial \psi}{\partial \sigma} \right\rangle = \left\langle \mathcal{L}[\sigma]\chi, \frac{\partial \psi}{\partial \sigma} \right\rangle,$$

since $\mathcal{L}[\sigma]$ is self-adjoint. So, by equation (6), χ must satisfy $$\mathcal{L}[\sigma]\chi = \psi - \psi_{meas} \quad (7).$$

Approximate Hessian Kernels

Using equation (4), the linearized forward modeling operation that maps the conductivity perturbations Δσ(x) to the electric-potential perturbation Δψ(t, x″) at the receivers is denoted in this example as $\mathcal{F}$. The approximate Hessian kernel of equation (5) is then $$\langle \mathcal{F}\delta(\cdot - x'), \mathcal{F}\delta(\cdot - x'') \rangle \quad (8).$$

Figure 5A:
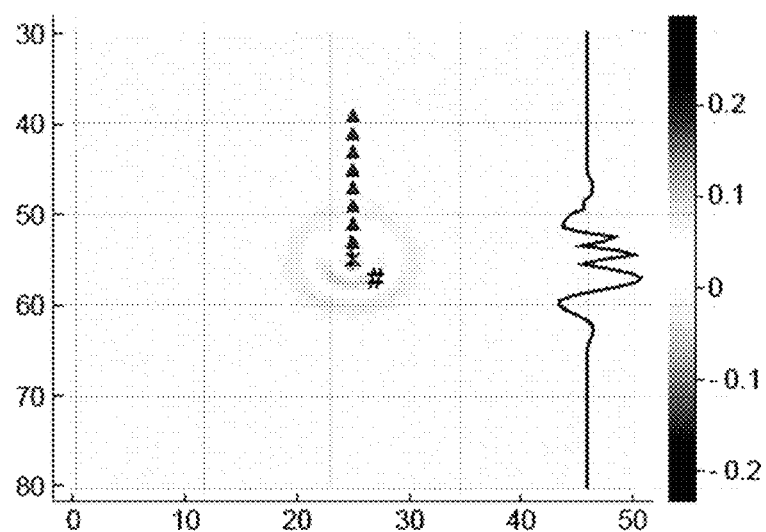
FIG. 5A is a plot of an approximate Hessian kernel at a first reference location, according to one example.
Figure 5B:
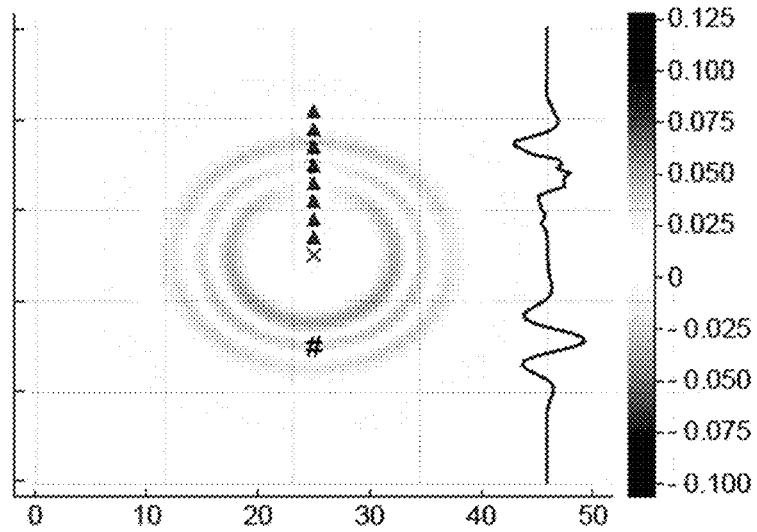
FIG. 5B is a plot of the approximate Hessian kernel at a second reference location, according to the example of FIG. 5A.
Figure 5C:
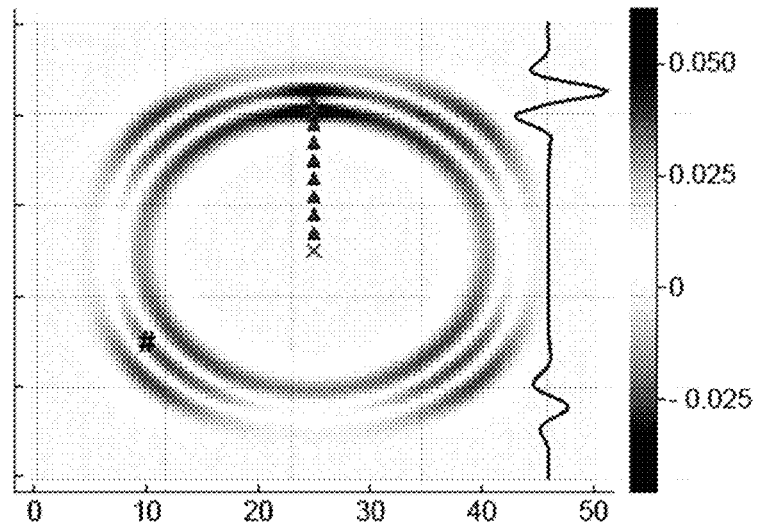
FIG. 5C is a plot of the approximate Hessian kernel at a third reference location, according to the example of FIG. 5A.

The plots in FIGS. 5A-5C depict visual representations of equation (8) from a numerical simulation using an exemplary acquisition geometry (e.g., on a drill string) comprising an acoustic source at $x_s$=(40,25) m (indicated by the × symbol in FIGS. 5A-5C) and eight collinear receivers on the drill string (indicated by the triangle symbols), drilling a medium with uniform σ(x)=10 S m$^{-1}$ and c(x)=3000 m s$^{-1}$. In particular, FIGS. 5A-5C depict the approximate Hessian kernals in two dimensions for three different reference locations x″, indicated by the # markers. Based on the typical use of the Hessian in classical Newtonian iterations, these plots show that the influence of any local update Δσ(x″) upon the reduction that Δσ(x′) induces in equation (5) is sensitive mostly just to radial differences ∥x′−$x_s$∥−∥x″−

$x_s\|$, not to directional differences between $x'-x_s$ and $x''-x_s$ (in contrast to purely acoustic Hessians). Thus, σ contrasts closer to $x_s$ will be better resolved than farther ones.

In this example, the medium is assumed to be layered in a horizontal dimension $x_1$ depicted in FIGS. 5A-5C, and independently of the vertical dimension $x_2$ such that $$\sigma(x)=\sigma(x_1), \tag{9}$$

which leaves only up-down ambiguity, as indicated by the curves on the right portion of each of FIGS. 5A-5C.

Numerical Simulations Based on Measured Well Data

Figure 6:
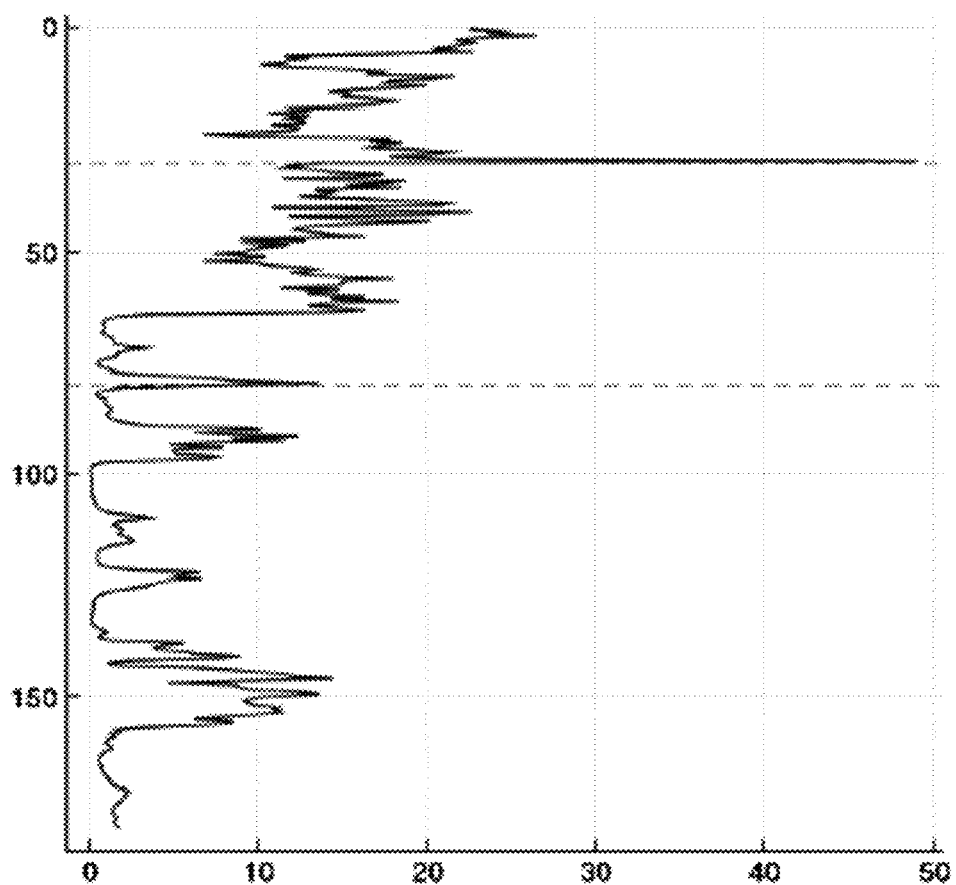
FIG. 6 is a plot of measured conductivity vs. depth according to one example.

FIG. 6 depicts a plot of measured well data from an offshore deviated well. In particular, FIG. 6 is a plot of the measured a (horizontal axis) vs. depth $x_1$ (vertical axis) for a single well, sampled every 15 cm for about 180 m. The reference $x_1$ has been subtracted and 1/σ has been scaled to have unit mean. The dashed lines in FIG. 6 show the portion of the data between 30 m and 80 m used in the numerical simulations as detailed below.

The data from FIG. 6 were used as a true model in connection with the simple acquisition geometry described above. An inverse problem defined by minimizing equation (5) is ill-posed due to the limited acquisition geometry, and thus some regularization is used in this example. First, this example requires that the inversion returns only layered solutions of the form of equation (9). Second, an explicit regularizing term R(σ) is added to equation (5) to promote specific structure in σ. The most classical choice is the Tikhonov regularization $$R(\sigma) \to \left\| \mathcal{C}^{-\frac{1}{2}}(\sigma - \sigma_0) \right\|_2^2 \tag{10}$$

which can be interpreted in a Bayesian view as enforcing a Gaussian prior distribution with mean $\sigma_0(x)$ and covariance operator $\mathcal{C}$. However, this view actually militates against equation (10) for the true model shown in FIG. 6. Indeed, inspecting the σ histogram over all of FIG. 6, the Gaussian assumption is inappropriate; the distribution exhibits significant skewness (1.03) and kurtosis (1.68). From a physical view, since conductivity in nature must be positive, but often is very small, the distribution is asymmetric, and displays a relatively long tail of large values. Thus it is more appropriate to assume as prior that σ follows a log-normal distribution, $$R(\sigma) = \left\| \mathcal{C}^{\frac{1}{2}}(\ln \sigma - \ln \sigma_0) \right\|_2^2. \tag{11}$$

The optimal choice for $\mathcal{C}$ is to take the covariance operator of the distribution of ln σ. Practically, $\mathcal{C}$ can be estimated using the empirical variogram of the FIG. 6 data, fitting an exponential model. In this example, ln $\sigma_0$ is taken to be the average value of ln σ over the domain.

The inversion is run by stacking $\psi_{meas}(t, \cdot)$ measurements taken at 30 values of t following the emission of a spherical wave by the source. The pressure field (not shown) over the employed t essentially resembles a wavelet propagating outward along the $\|x_s-x\|-ct$ front, and is uniformly sampled over t. The limiting factor in the sampling of the measurement is the computational burden of the forward modeling (equations 1 and 3) and gradient codes from equation (7), as it is proportional to the number of t samples.

Figure 7A:
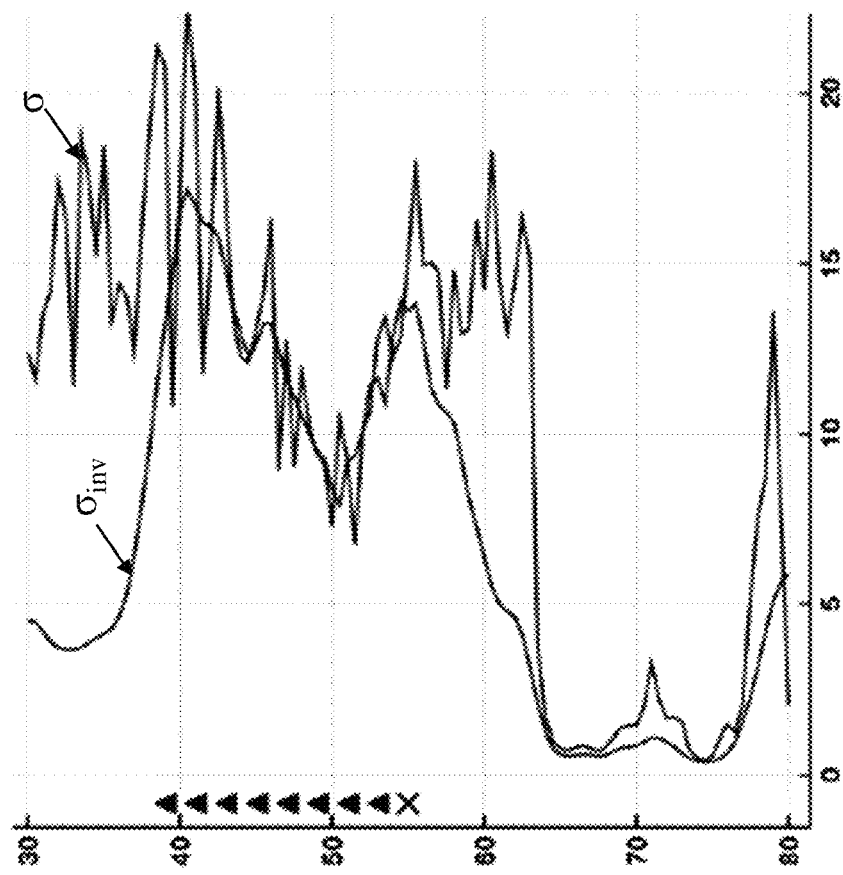
FIG. 7A is a plot showing estimated conductivity values compared to the measured conductivity values of FIG. 6 taken as true values, according to one example.
Figure 7B:
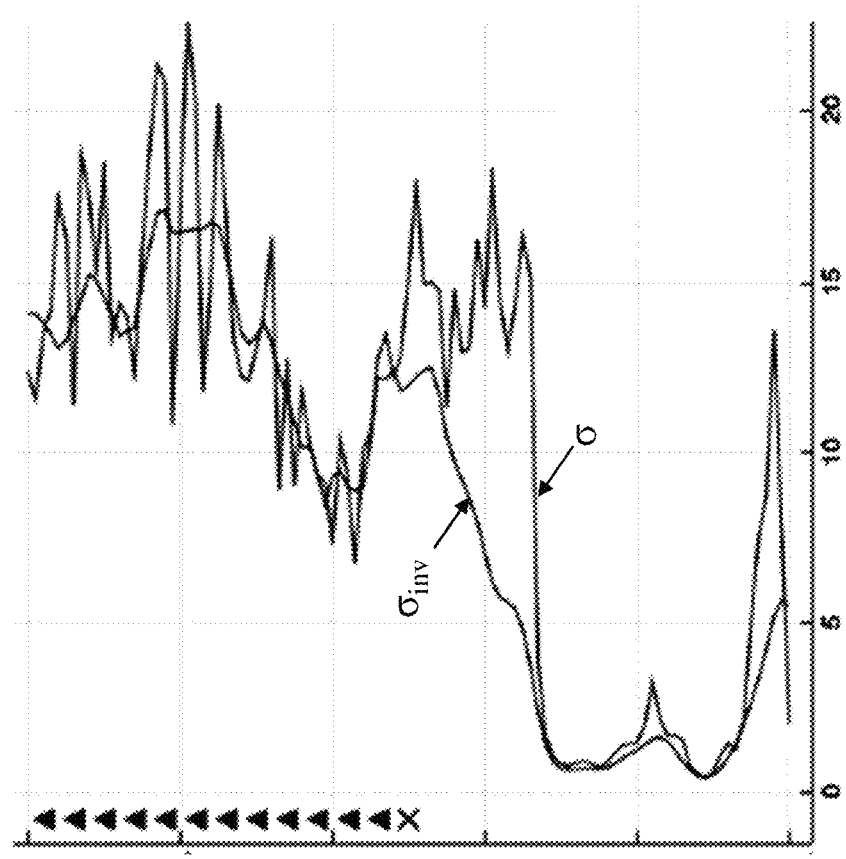
FIG. 7B is a plot showing estimated conductivity values compared to measured conductivity values of FIG. 6 taken as true values, according to another example.

FIGS. 7A and 7B depict plots of the results of the above-described inversion process. In particular FIGS. 7A and 7B shows the true conductivity σ and the results from the inversion process $\sigma_{inv}$ for example drill string geometries having eight and twelve receivers, respectively, as indicated by the triangle markers. As shown in these figures, the trend of the conductivity distribution is captured very well away from the domain boundaries, and the sharp decrease in conductivity ahead of the drill (i.e., at depths below the source and receivers) is very well reconstructed, which is of particular use for monitoring of drilling operations ahead of the drill bit.

Some limitations of the inversion process near the domain boundaries, in particular above the receivers, illustrate the up-down ambiguity discussed above. In some examples, some approaches to reduce this uncertainty include, but are not limited to, adding direct measurements behind the bit (e.g., with a LWD system) in the sequential Bayesian estimation approach described herein; using acoustic source arrays to concentrate seismoelectric conversion above and below the receivers independently; and/or increasing the number of electrodes above the drill bit to measure a larger part of the domain with direct transmission. FIG. 7B illustrates the results of this third approach. In particular, the reconstruction in the upper domain is now much better compared to the plot shown in FIG. 7A with fewer receivers. Of note, the increased number of receivers also improves the inversion ahead of the tool, consistent with the fact that, by reducing the uncertainty behind the bit, data misfit to the model ahead of the bit can be better allocated.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computing devices or processors to implement various aspects of the present disclosure.

Processor-executable instructions may be in many forms, such as program modules, executed by one or more computing devices or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Accordingly, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A drilling system comprising:
   a drill bit configured to be positioned at an end of a drill string;
   one or more sources positioned on the drill string behind the drill bit and configured to emit a signal into a medium and generate a response signal from one or more discrete locations within the medium ahead of the drill bit;
   one or more receivers positioned on the drill string behind the drill bit and configured to detect the response signal; and
   a processor operatively coupled to the one or more sources and the one or more receivers, wherein the processor is configured to iteratively update an estimate of one or more properties of the medium at the one or more discrete locations, based at least in part, on the response signal detected by the one or more receivers from a current iteration.

2. The drilling system of claim 1, wherein the processor is configured to iteratively update the estimate of the one or more properties of the medium via a sequential estimation process.

3. The drilling system of claim 2, wherein the sequential estimation process is a sequential Bayesian estimation process.

4. The drilling system of claim 1, wherein the signal comprises an acoustic, elastic, and/or electromagnetic signal.

5. The drilling system of claim 4, wherein the processor is configured to operate the one or more sources such that the signal is focused at the one or more discrete locations within a predetermined time interval.

6. The drilling system of claim 1, wherein the response signal comprises an electromagnetic signal caused by seismo-electromagnetic conversion at the one or more discrete locations within the predetermined time interval.

7. The drilling system of claim 1, wherein the one or more properties of the medium comprise a conductivity, a formation layer or feature thickness, and/or a pore pressure at the one or more discrete locations.

8. The drilling system of claim 1, wherein the processor is configured to store the updated estimate of the one or more properties of the medium at the one or more discrete locations in a data set on a non-transitory computer readable storage medium during each iteration.

9. The drilling system of claim 1, wherein the processor is configured to output an indication of the updated estimate of the one or more properties of the medium on a display.

10. The drilling system of claim 1, wherein the processor is configured to control at least one aspect of a drilling operation based at least in part on the updated estimate of the one or more properties of the medium.

11. The drilling system of claim 1, wherein the processor is configured to iteratively update the estimate of the one or more properties of the medium at the one or more discrete locations based at least in part on the updated estimate of the medium property from a prior iteration and the measured response signal from the current iteration.

12. The drilling system of claim 11, wherein the one or more discrete locations comprise a first discrete location and a second discrete location, and wherein the processor is configured to iteratively update the estimate of the one or more properties of the medium at each of the first discrete location and the second discrete location separately.

13. A method for determining a medium property ahead of a tool, the method comprising:
obtaining an initial estimate of a medium property at a first predetermined discrete location within the medium; and
iteratively updating an estimate of the medium property by iteratively performing the steps of:
emitting a signal from a tool towards the first predetermined discrete location, wherein the first predetermined discrete location is located ahead of an end of the tool;
measuring a response signal from the first predetermined discrete location; and
determining an updated estimate of the medium property at the first predetermined discrete location, wherein during an initial iteration the updated estimate of the medium property is determined based at least in part on the initial estimate of the medium property and the measured response signal, and wherein during subsequent iterations the updated estimate of the medium property is determined based at least in part on the updated estimate of the medium property from a prior iteration and the measured response signal from a current iteration.

14. The method of claim 13, wherein the signal comprises an acoustic, elastic, and/or electromagnetic signal.

15. The method of claim 13, wherein the response signal comprises an electromagnetic signal.

16. The method of claim 13, wherein the medium property comprises a conductivity, a formation layer or feature thickness, and/or a pore pressure.

17. The method of claim 13, further comprising storing the updated estimate of the medium property in a data set on a non-transitory computer readable storage medium during each iteration.

18. The method of claim 13, further comprising controlling at least one aspect of an operation of the tool based at least in part on the updated estimate of the medium property.

19. The method of claim 13, further comprising outputting an indication of the updated estimate of the medium property to an operator.

20. The method of claim 13, wherein the medium is tissue.

21. The method of claim 13, wherein iteratively updating the estimate includes:
emitting the signal towards both the first discrete location and separately towards a second discrete location located ahead of the end of the tool;
measuring the response signal from both the first discrete location and separately from the second discrete location;
determining the updated estimate at both the first predetermined discrete location and separately at the second predetermined discrete location based at least in part on the updated estimate of the medium from the prior iteration and the measured response signal from the current iteration.

22. At least one non-transitory computer-readable storage medium storing processor executable instructions that, when executed by at least one hardware processor, cause the at least one hardware processor to perform a method comprising:
obtaining an initial estimate of a medium property at a first predetermined discrete location within the medium; and
iteratively updating an estimate of the medium property by iteratively performing the steps of:
emitting a signal from a tool towards the first predetermined discrete location, wherein the first predetermined discrete location is located ahead of an end of the tool;
measuring a response signal from the first predetermined discrete location; and
determining an updated estimate of the medium property at the first predetermined discrete location, wherein during an initial iteration the updated estimate of the medium property is determined based at least in part on the initial estimate of the medium property and the measured response signal, and wherein during subsequent iterations the updated estimate of the medium property is determined based at least in part on the updated estimate of the medium property from a prior iteration and the measured response signal from a current iteration.

23. The at least one non-transitory computer-readable storage medium of claim 22, wherein the signal comprises an acoustic, elastic, and/or electromagnetic signal.

24. The at least one non-transitory computer-readable storage medium of claim 22, wherein the response signal comprises an electromagnetic signal.

25. The at least one non-transitory computer-readable storage medium of claim 22, wherein the medium property comprises a pore pressure.

26. The at least one non-transitory computer-readable storage medium of claim 22, wherein the method further comprises storing the updated estimate of the medium property in a data set on the non-transitory computer readable storage medium during each iteration.

27. The at least one non-transitory computer-readable storage medium of claim 22, wherein the method further comprises controlling at least one aspect of an operation of the tool based at least in part on the updated estimate of the medium property.

28. The at least one non-transitory computer-readable storage medium of claim 22, wherein the method further comprises outputting an indication of the updated estimate of the medium property to an operator.

29. The at least one non-transitory computer-readable storage medium of claim 22, wherein the medium is tissue.

30. The at least one non-transitory computer-readable storage medium of claim 22, wherein iteratively updating the estimate includes:
- emitting the signal towards both the first discrete location and separately towards a second discrete location located ahead of the end of the tool;
- measuring the response signal from both the first discrete location and separately from the second discrete location;
- determining the updated estimate at both the first predetermined discrete location and separately at the second predetermined discrete location based at least in part on the updated estimate of the medium from the prior iteration and the measured response signal from the current iteration.

* * * * *